United States Patent
Oh

(10) Patent No.: US 11,511,625 B2
(45) Date of Patent: Nov. 29, 2022

(54) VEHICLE INFOTAINMENT SYSTEM AND METHOD OF CONTROLLING THE SAME

(71) Applicants: HYUNDAI MOTOR COMPANY, Seoul (KR); KIA MOTORS CORPORATION, Seoul (KR)

(72) Inventor: Hyung Suk Oh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 737 days.

(21) Appl. No.: 16/534,210

(22) Filed: Aug. 7, 2019

(65) Prior Publication Data

US 2020/0164747 A1 May 28, 2020

(30) Foreign Application Priority Data

Nov. 22, 2018 (KR) .................. 10-2018-0145596

(51) Int. Cl.
| | |
|---|---|
| *B60K 35/00* | (2006.01) |
| *G06F 8/65* | (2018.01) |
| *H04M 1/72406* | (2021.01) |
| *H04M 1/72412* | (2021.01) |

(52) U.S. Cl.
CPC ............... *B60K 35/00* (2013.01); *G06F 8/65* (2013.01); *H04M 1/72406* (2021.01); *H04M 1/72412* (2021.01); *B60K 2370/573* (2019.05); *B60K 2370/577* (2019.05); *B60K 2370/589* (2019.05); *B60K 2370/5911* (2019.05)

(58) Field of Classification Search
None
See application file for complete search history.

(56) References Cited

U.S. PATENT DOCUMENTS

| | | | | |
|---|---|---|---|---|
| 5,247,565 | A * | 9/1993 | Joglekar | H04M 1/724 455/565 |
| 9,848,457 | B1 * | 12/2017 | Yae | H04W 76/14 |
| 10,885,731 | B2 * | 1/2021 | Menard | H04W 12/06 |
| 2009/0079622 | A1 * | 3/2009 | Seshadri | G01S 19/05 342/357.42 |
| 2012/0320874 | A1 * | 12/2012 | Li | H04W 48/12 370/328 |
| 2014/0191911 | A1 * | 7/2014 | Merrick | H01Q 1/3283 343/712 |
| 2016/0094882 | A1 * | 3/2016 | Jeon | H04N 21/4532 725/140 |

* cited by examiner

*Primary Examiner* — Carlos Garcia

(74) *Attorney, Agent, or Firm* — Morgan, Lewis & Bockius LLP

(57) ABSTRACT

A vehicle infotainment system for performing a large file transfer (SATA), music (USB), phone projection (CarPlay/Android Auto/MirrorLink), a modem (USB) and a phone mirroring (MHL) function using a millimeter wave short-range communication method in a band of 30 GHz to 300 GHz for a link between the vehicle infotainment system and a smartphone.

12 Claims, 4 Drawing Sheets

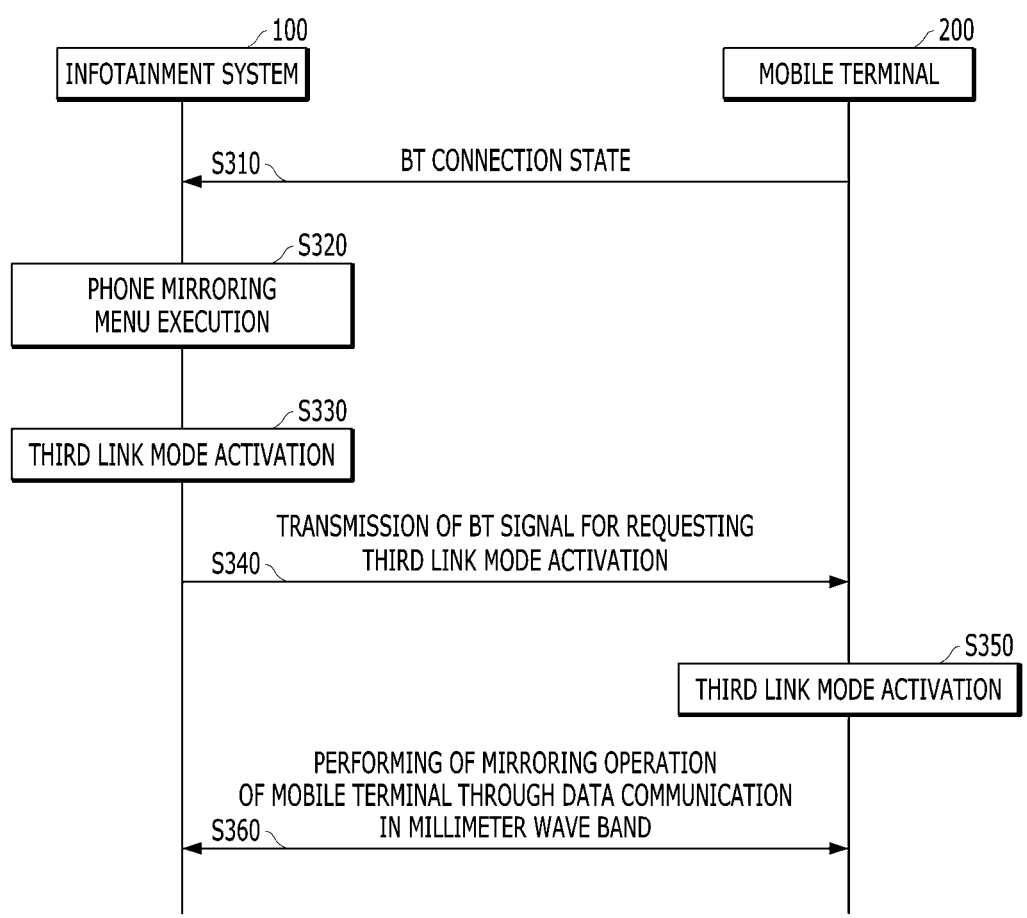

— 1 —

VEHICLE INFOTAINMENT SYSTEM AND METHOD OF CONTROLLING THE SAME

This application claims the benefit of priority to Korean Patent Application No. 10-2018-0145596, filed on Nov. 22, 2018 in the Korean Intellectual Property Office, the entire content of which is incorporated herein by reference.

TECHNICAL FIELD

The present disclosure relates to a vehicle infotainment system and, more particularly, to a vehicle infotainment system capable of being connected to an external mobile terminal for function linkage, and a method of controlling the same.

BACKGROUND

When a vehicle infotainment system is wirelessly connected to a mobile terminal such as a smartphone using Wi-Fi (2.4 GHz or 5 GHz), since an ISM frequency band is used, it is necessary to use technology of modulating/demodulating compressed data using a codec and wireless interference. Accordingly, it is difficult to realize a wireless data transmission/reception speed at the level of several Gbps, such that a mirroring image is cut off, mirroring sound is delayed or disconnection occurs. Therefore, there is a need for a new wireless interface connection and control technology.

Miracast technology based on Wi-Fi 802.11n and technology based on 802.11ac/ad as existing wireless image transmission technology have the following problems.

First, in Miracast technology, image delay of about 350 ms occurs, settings are very complicated, a pairing time of about 20 seconds is required and buffering frequently occurs.

In addition, in technology based on 802.11ac/ad, power consumption is up to tens of watts, a chipset size is large, the connector standard is based on PC (HDMI), and the price thereof is relatively high.

SUMMARY

Accordingly, the present disclosure is directed to a vehicle infotainment system and a method of controlling the same that substantially obviate one or more problems due to limitations and disadvantages of the related art.

An objective of the present disclosure is to provide a vehicle infotainment system capable of performing large file transfer (SATA), music (USB), phone projection (CarPlay/Android Auto/MirrorLink), a modem (USB) and a phone mirroring (MHL) function using a millimeter wave short-range communication method in a band of 30 GHz to 300 GHz for link between the vehicle infotainment system and a smartphone, and a method of controlling the same.

Additional advantages, objectives, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objectives and other advantages and in accordance with the purpose of the present disclosure, as embodied and broadly described herein, a vehicle infotainment system may include a short-range wireless communication module configured to establish a wireless communication with an external mobile terminal, a communication module configured to transmit data to and receive data from the mobile terminal using a communication method in a specific band through at least one link mode, and a controller configured to activate a first link mode for using content of the mobile terminal in the vehicle infotainment system of the at least one link mode when the wireless communication with the mobile terminal is established and to transmit a first control signal for controlling the mobile terminal to activate the first link mode to the mobile terminal through the short-range wireless communication module.

At this time, the communication method in the specific band may include millimeter wave wireless communication in a band of 30 GHz to 300 GHz.

The first link mode may be a USB mode, and the controller may activate the USB mode by default and transmit the first control signal for controlling the mobile terminal to activate the USB mode, when the wireless communication with the mobile terminal is established.

The controller may be further configured to activate a second link mode for updating the vehicle infotainment system through software stored in the mobile terminal of the at least one link mode, when a software update menu item is selected, transmit a second control signal for controlling the mobile terminal to activate the second link mode to the mobile terminal through the short-range wireless communication module, and update the vehicle infotainment system using the software stored in the mobile terminal through the communication module, when the mobile terminal activates the second link mode. At this time, the second link mode may include a serial AT attachment (SATA) mode.

The vehicle infotainment system may further include an output device configured to mirror and output media output from the mobile terminal, and the controller may be further configured to activate a third link mode for mirroring of media output from the mobile terminal of the at least one link mode, when a mirroring menu item is selected, transmit a third control signal for controlling the mobile terminal to activate the third link mode to the mobile terminal through the short-range wireless communication module, and mirror the media output from the mobile terminal through the communication module and outputs the media through the output device, when the mobile terminal activates the third link mode. At this time, the third link mode may include a mobile high-definition link (MHL) mode.

In another aspect of the present disclosure, a method of controlling a vehicle infotainment system includes establishing a wireless communication with an external mobile terminal, activating a first link mode of at least one link mode for transmitting data to and receiving data from the mobile terminal using a communication method in a specific band, and transmitting, to the mobile terminal, a first control signal for controlling the mobile terminal to activate the first link mode through the wireless communication.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a signal processing diagram showing a process of performing data communication according to a third link mode between a vehicle infotainment system and a mobile terminal according to an exemplary embodiment of the present disclosure.

DETAILED DESCRIPTION

Figure 1:
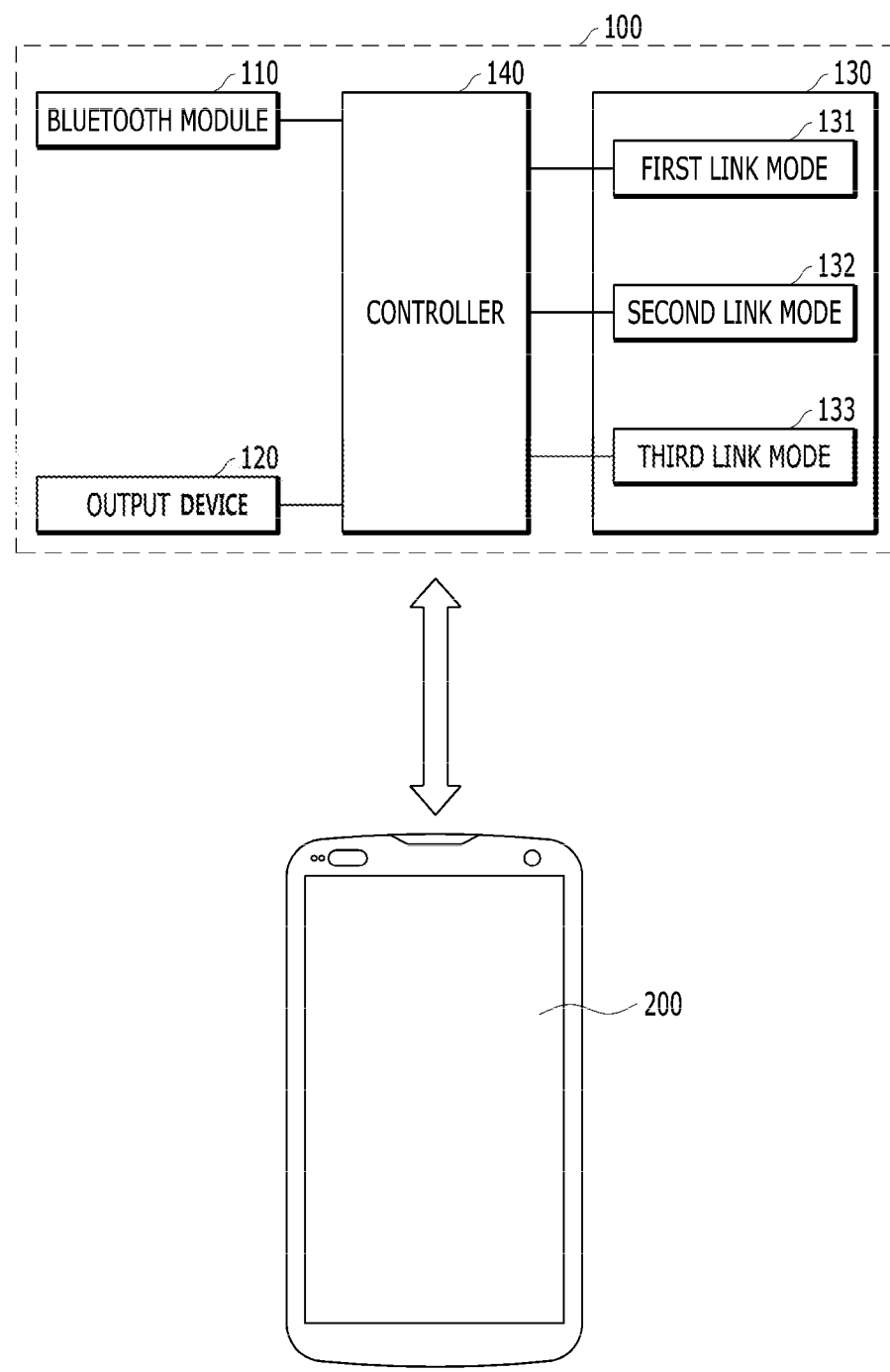
FIG. 1 is a block diagram showing the configuration of a vehicle infotainment system according to an exemplary embodiment of the present disclosure.

Hereinafter, various exemplary embodiments of the present disclosure will be described in detail with reference to the accompanying drawings. Like reference numerals in the drawings denote like elements, and thus their description will be omitted. The terms "unit", "-or/er" and "module" described in the specification indicate a unit for processing at least one function or operation, which may be implemented by hardware, software or a combination thereof. In describing the present disclosure, a detailed description of known functions and configurations will be omitted when it may obscure the subject matter of the present disclosure. The accompanying drawings are used to help easily understood the technical idea of the present disclosure and it should be understood that the idea of the present disclosure is not limited by the accompanying drawings. The idea of the present disclosure should be construed to extend to any alterations, equivalents and substitutions besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected to" another element, the element can be directly connected to the other element or intervening elements may also be present. In contrast, when an element is referred to as being "directly connected to" another element, there are no intervening elements present.

A singular representation may include a plural representation unless context clearly indicates otherwise.

In this specification, the term "have" or "include" signifies the presence of a specific feature, number, step, operation, component, part, or combinations thereof, not excluding the presence or addition of one or more other features, numbers, steps, operations, components, parts, or combinations thereof.

Hereinafter, the present disclosure will be described in detail with reference to FIGS. 1 to 4.

Figure 2:
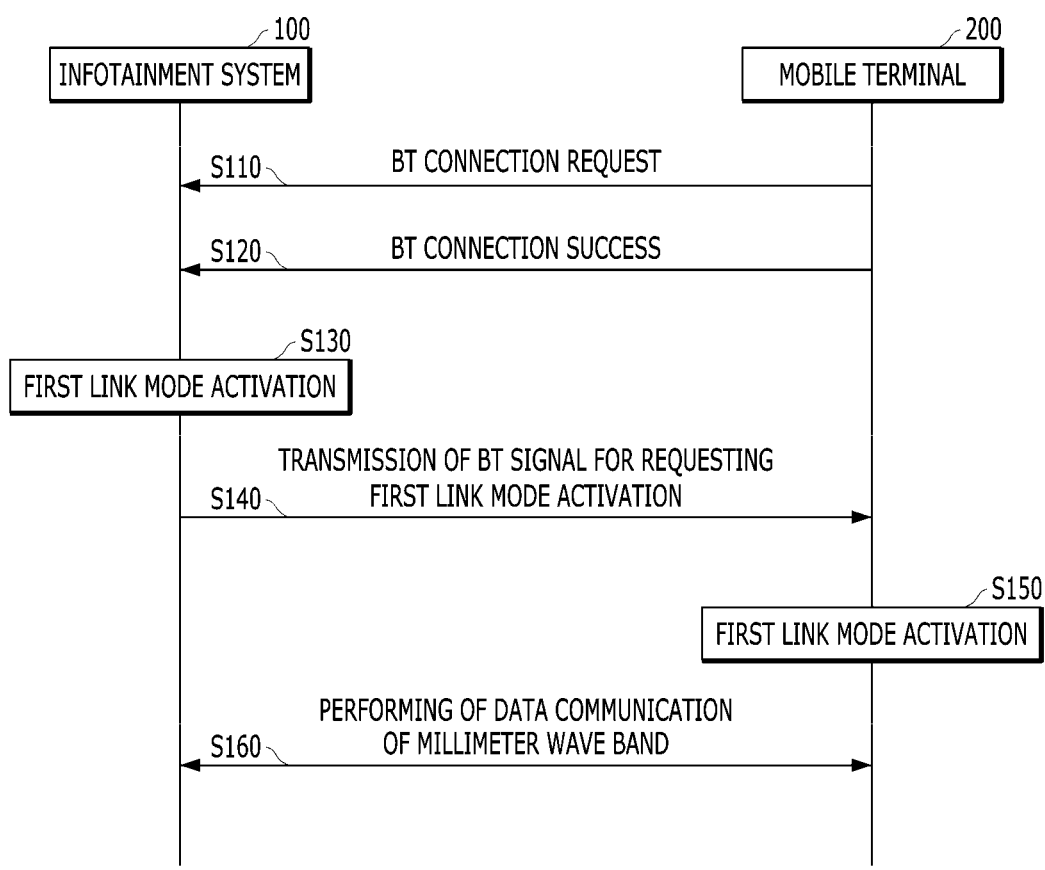
FIG. 2 is a signal processing diagram showing a process of performing data communication according to a first link mode between a vehicle infotainment system and a mobile terminal according to an exemplary embodiment of the present disclosure.

FIG. 1 is a block diagram showing the configuration of a vehicle infotainment system according to an exemplary embodiment of the present disclosure, and FIG. 2 is a signal processing diagram showing a process of performing data communication according to a first link mode between a vehicle infotainment system and a mobile terminal according to an exemplary embodiment of the present disclosure.

Figure 3:
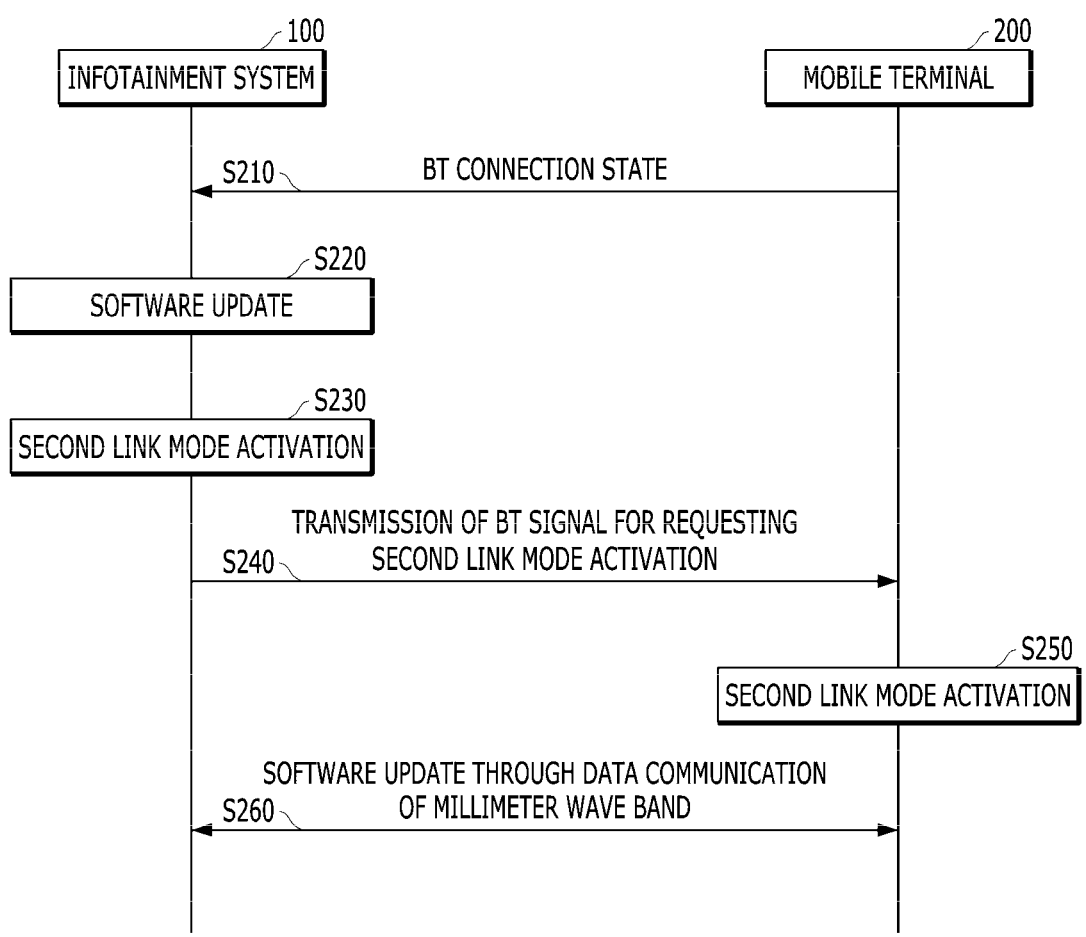
FIG. 3 is a signal processing diagram showing a process of performing data communication according to a second link mode between a vehicle infotainment system and a mobile terminal according to an exemplary embodiment of the present disclosure.

In addition, FIG. 3 is a signal processing diagram showing a process of performing data communication according to a second link mode between a vehicle infotainment system and a mobile terminal according to an exemplary embodiment of the present disclosure, and FIG. 4 is a signal processing diagram showing a process of performing data communication according to a third link mode between a vehicle infotainment system and a mobile terminal according to an exemplary embodiment of the present disclosure.

Referring to FIGS. 1 to 4, the present disclosure may provide a first link mode as a music and phone projection CarPlay/Android Auto/MirrorLink) using wireless communication of a specific band, a second link mode as large file transfer (SATA) and a third link mode as a phone mirroring (MHL) function using wireless communication in a specific band, for linkage between a vehicle infotainment system 100 and a mobile terminal 200 such as a smartphone.

At this time, the wireless communication in the specific band means millimeter wave (mmWave) wireless communication method in a band of 30 GHz to 300 GHz.

The mmWave wireless communication method has a frequency band of 60 GHz, a transmission speed of 6.75 Gbps, modulation/demodulation technology of OOK SC (64QAM), and a latency of 30 ms, and realizes miniaturization, non-compression and low power as compared to existing Wi-Fi technology.

Accordingly, in the present disclosure, the mobile terminal may be instructed to activate a link mode (any one of the first to third link modes) currently activated in the vehicle infotainment system 100 through Bluetooth communication, and data communication corresponding to the link mode currently activated in the vehicle infotainment system 100 and the mobile terminal 200 may be performed through millimeter wave communication.

The vehicle infotainment system 100 is a system, in which information necessary for driving and route guidance and entertainment including a variety of entertainment and human-friendly functions are integrated, and is a combination of navigation, audio and video and the Internet inside a vehicle. In addition, the vehicle infotainment system is a system in which entertainment and information which can be enjoyed in the vehicle are integrated, and may include Internet search, movies, games, TV, social network services (SNSs), navigation, and devices and technologies for providing various services linked with mobile terminals.

In the following description, the components of the vehicle infotainment system 100 for instructing the mobile terminal to activate a link mode (any one of the first to third link modes) currently activated in the vehicle infotainment system 100 through Bluetooth communication and performing data communication corresponding to the link mode currently activated in the vehicle infotainment system 100 and the mobile terminal 200 through mmWave communication will be described.

First, when a Bluetooth (BT) connection request signal is received from the mobile terminal 200, a short-range wireless communication module, e.g., Bluetooth module 110, transmits a response signal thereto to the mobile terminal 200 to establish Bluetooth communication with the mobile terminal 200, and transmits and receives Bluetooth signals to and from the mobile terminal 200.

In addition, in the present disclosure, the Bluetooth module 110 may transmit, to the mobile terminal 200, a control signal for controlling the link mode (any one of the first to third link modes) currently activated in the vehicle infotainment system 100 to be activated in the mobile terminal 200, under control of a controller 140.

An output device 120 of the vehicle infotainment system 100 is a navigation device including, for example, a speaker of the vehicle, and may output a navigation map on a screen and provide information about an area, in which the vehicle currently travels, and a movement route to a destination set by a user on the navigation map.

The output device 120 may include, for example, a display, an acoustic output device, etc.

The display may be a touchscreen and may display information about various media and navigation. The acoustic output device may output voice/sound effects/warning sounds related to the vehicle and navigation, various media, and danger warning sound while traveling.

A communication module 130 of the vehicle infotainment system 100 performs data communication corresponding to the link mode currently activated in the vehicle infotainment system 100 and the mobile terminal 200 through mmWave communication according to the present disclosure.

The communication module 130 may be a hardware device implemented by various electronic circuits, e.g., processor, to transmit and receive signals via wireless or wired connections.

That is, the communication module 130 includes a first link mode 131 as a music and phone projection CarPlay/Android Auto/MirrorLink) of the mobile terminal 200, a second link mode 132 as large file transfer (SATA) of the mobile terminal 200 and a third link mode 133 as a phone mirroring (MHL) function of the mobile terminal 200, using mmWave communication.

The controller 140 of the vehicle infotainment system 100 according to an exemplary embodiment of the present disclosure may be a processor (e.g., computer, microprocessor, CPU, ASIC, circuitry, logic circuits etc.). The controller 140 may be implemented by a non-transitory memory storing, e.g., a program(s), software instructions reproducing algorithms, etc., which, when executed, controls operations of various components of the vehicle infotainment system 100, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The controller 140 controls overall operation of the vehicle infotainment system 100 according to an exemplary embodiment of the present disclosure. Hereinafter, a process of controlling the mobile terminal 200 to activate a link mode (any one of the first to third link modes) currently activated in the vehicle infotainment system 100 through Bluetooth communication and performing data communication corresponding to the link mode currently activated in the vehicle infotainment system 100 and the mobile terminal 200 through mmWave communication will be described in detail with reference to FIGS. 2 to 4.

First, referring to FIG. 2, when a Bluetooth connection request signal is received from the mobile terminal 200 through the Bluetooth module 110 [S110], the controller 140 transmits a response signal to the request signal to the mobile terminal 200 through the Bluetooth module 110 to establish Bluetooth communication with the mobile terminal 200 [S120].

In addition, the controller 140 activates the first link mode 131 of the first to third link modes 131, 132 and 133 by default [S130], and transmits a first control signal for controlling the mobile terminal 200 to activate the first link mode 131 to the mobile terminal 200 through the Bluetooth module 110 [S140].

At this time, the first link mode 131 includes a USB mode, and the USB mode means a mode for performing the phone projection function of the mobile terminal 200 through CarPlay of Apple, Android Auto of Google, MirrorLink, or CarLife and a mode for outputting music output from the mobile terminal 200 through the output device 120.

Meanwhile, when the first control signal is received, the mobile terminal 200 activates the first link mode 131 equally to the vehicle infotainment system 100, and transmits a BT signal indicating that the first link mode 131 is activated to the vehicle infotainment system 100 [S150].

As described above, when both the vehicle infotainment system 100 and the mobile terminal 200 activate the first link mode 131, the vehicle infotainment system 100 and the mobile terminal 200 are connected through the USB standard protocol according to the first link mode 131 and are ready for data communication, thereby performing data communication according to the first link mode 131 through an mmWave band [S160].

Next, referring to FIG. 3, when the user selects a software update menu item of the vehicle infotainment system 100 through the output device 120 in a state in which Bluetooth communication with the mobile terminal 200 is established by the process of FIG. 2 [S210], the controller 140 primarily determines whether an SD card, on which the software to be updated is stored, is installed in an SD card port of the vehicle infotainment system 100 or whether a USB memory, in which the software to be updated is stored, is installed in a USB port of the vehicle infotainment system 100 [S220].

When the SD or USB card, on which the software to be updated is stored, is installed, the controller 140 updates the vehicle infotainment system 100 through the software stored on the SD or USB card on which the software to be updated is stored.

However, when the SD or USB card, on which the software to be updated is stored, is not installed, the controller 140 deactivates the first link mode 131 of FIG. 2, activates the second link mode 132 for updating the vehicle infotainment system through the software stored in the mobile terminal 200 [S230], and transmits, to the mobile terminal 200, a second control signal for controlling the mobile terminal 200 to activate the second link mode 132 through the Bluetooth module 110 [S240].

At this time, the second link mode 132 includes an SATA mode, and the SATA mode refers to a mode in which software stored in an internal or external memory of the mobile terminal 200 is downloaded to update the vehicle infotainment system.

Meanwhile, when the second control signal is received, the mobile terminal 200 activates the second link mode 132 equally to the vehicle infotainment system 100 and transmits a BT signal indicating that the second link mode 132 is activated to the vehicle infotainment system 100 [S250].

As described above, when both the vehicle infotainment system 100 and the mobile terminal 200 activate the second link mode 132, the vehicle infotainment system 100 and the mobile terminal 200 are connected through the SATA standard protocol according to the second link mode 132 and are ready for data communication, and the controller 140 downloads the software stored in the internal or external memory of the mobile terminal 200 through the second link mode 132 of the communication module 130 and updates the vehicle infotainment system 100 with the newest software [S260].

Lastly, referring to FIG. 4, when the user selects a phone mirroring menu item for controlling the screen and sound of the mobile terminal 200 in the vehicle infotainment system 100 through the output device 120 in a state in which Bluetooth communication with the mobile terminal 200 is established by the process of FIG. 2 [S310], the controller 140 activates the third link mode 133 for phone mirroring of the mobile terminal 200 [S330], and transmits a third control signal for controlling the mobile terminal 200 to activate the third link mode 133 to the mobile terminal 200 through the Bluetooth module 110 [S340].

At this time, the third link mode 133 includes an MHL mode, and the MHL mode means a function for copying the screen and sound of media output from the mobile terminal 200 and outputting the screen and sound through the output device 120 and a function for controlling currently mirrored operation of the mobile terminal 200 through touch operation of the output device 120.

Meanwhile, when the third control signal is received, the mobile terminal 200 activates the third link mode 133 equally to the vehicle infotainment system 100, and transmits a BT signal indicating that the third link mode 133 is activated to the vehicle infotainment system 100 [S350].

As described above, when both the vehicle infotainment system 100 and the mobile terminal 200 activate the third link mode 133, the vehicle infotainment system 100 and the mobile terminal 200 are connected through the mobile high-definition link (MHL) standard protocol according to the third link mode 133 and are ready for data communication, and the controller 140 mirrors media output from the mobile terminal 200 through the third link mode 133 of the communication module 130 and outputs the media through the output device 120.

According to one exemplary embodiment of the present disclosure, when a user performs an arbitrary function requiring linkage between a vehicle infotainment system and a smartphone, the vehicle infotainment system automatically controls and change the standard protocol of millimeter short-range communication between the vehicle infotainment system and the smartphone as a connection standard protocol suitable for execution of the function through BT RFCOMM channel, through fast data transmission/reception of 6 Gbps and low power technology, it is possible to feel AP performance of the newest smartphone in the vehicle infotainment system through vehicle linkage and to reduce the material cost of the vehicle infotainment system.

It will be appreciated by those skilled in the art that the effects achievable through the invention are not limited to those that have been particularly described hereinabove, and other effects of the invention will be more clearly understood from the above detailed description.

Meaning of terminology used herein should be determined in consideration of functionality of the present disclosure, and may be variable depending on user's or operator's intention, or customs in the art. Therefore, corresponding meaning should be determined with reference to the entirety of the specification.

The present disclosure is not limited to the above-described embodiments and various changes and modifications may be made by those skilled in the art, which are within the spirit and scope of the present disclosure as defined in the appended claims.

What is claimed is:

1. A vehicle infotainment system comprising:
   a short-range wireless communication module configured to establish a wireless communication with a mobile terminal;
   a communication module configured to transmit data to and receive data from the mobile terminal using a communication method in a specific band through at least one link mode; and
   a controller configured to activate a first link mode for using content of the mobile terminal in the vehicle infotainment system of the at least one link mode when the wireless communication with the mobile terminal is established and to transmit a first control signal for controlling the mobile terminal to activate the first link mode to the mobile terminal through the short-range wireless communication module,
   wherein the first link mode is a USB mode, and
   wherein the controller activates the USB mode by default and transmits the first control signal for controlling the mobile terminal to activate the USB mode, when the wireless communication with the mobile terminal is established.

2. The vehicle infotainment system according to claim 1, wherein the communication method in the specific band includes a millimeter wave wireless communication in a band of 30 GHz to 300 GHz.

3. A vehicle infotainment system comprising:
   a short-range wireless communication module configured to establish a wireless communication with a mobile terminal;
   a communication module configured to transmit data to and receive data from the mobile terminal using a communication method in a specific band through at least one link mode; and
   a controller configured to activate a first link mode for using content of the mobile terminal in the vehicle infotainment system of the at least one link mode when the wireless communication with the mobile terminal is established and to transmit a first control signal for controlling the mobile terminal to activate the first link mode to the mobile terminal through the short-range wireless communication module,
   wherein the controller is further configured to:
   activate a second link mode for updating the vehicle infotainment system through software stored in the mobile terminal of the at least one link mode, when a software update menu item is selected,
   transmit a second control signal for controlling the mobile terminal to activate the second link mode to the mobile terminal through the short-range wireless communication module, and
   update the vehicle infotainment system using the software stored in the mobile terminal through the communication module, when the mobile terminal activates the second link mode.

4. The vehicle infotainment system according to claim 3, wherein the second link mode includes a serial AT attachment (SATA) mode.

5. A vehicle infotainment system comprising:
   a short-range wireless communication module configured to establish a wireless communication with a mobile terminal;
   a communication module configured to transmit data to and receive data from the mobile terminal using a communication method in a specific band through at least one link mode;
   a controller configured to activate a first link mode for using content of the mobile terminal in the vehicle infotainment system of the at least one link mode when the wireless communication with the mobile terminal is established and to transmit a first control signal for controlling the mobile terminal to activate the first link mode to the mobile terminal through the short-range wireless communication module; and an output device configured to mirror and output media output from the mobile terminal, wherein the controller is further configured to:

activate a third link mode for mirroring of media output from the mobile terminal of the at least one link mode, when a mirroring menu item is selected, transmit a third control signal for controlling the mobile terminal to activate the third link mode to the mobile terminal through the short-range wireless communication module, and mirror the media output from the mobile terminal through the communication module and outputs the media through the output device, when the mobile terminal activates the third link mode.

6. The vehicle infotainment system according to claim 5, wherein the third link mode includes a mobile high-definition link (MHL) mode.

7. A method of controlling a vehicle infotainment system, the method comprising:

establishing a wireless communication with a mobile terminal;

activating a first link mode of at least one link mode for transmitting data to and receiving data from the mobile terminal using a communication method in a specific band; and transmitting, to the mobile terminal, a first control signal for controlling the mobile terminal to activate the first link mode through the wireless communication, wherein the first link mode is a USB mode, wherein the activating includes activating the USB mode by default when the wireless communication with the mobile terminal is first established, and wherein the transmitting includes transmitting the first control signal for controlling the mobile terminal to activate the USB mode.

8. The method according to claim 7, wherein the communication method in the specific band includes a millimeter wave wireless communication in a band of 30 GHz to 300 GHz.

9. A method of controlling a vehicle infotainment system, the method comprising:

establishing a wireless communication with a mobile terminal;

activating a first link mode of at least one link mode for transmitting data to and receiving data from the mobile terminal using a communication method in a specific band;

transmitting, to the mobile terminal, a first control signal for controlling the mobile terminal to activate the first link mode through the wireless communication;

activating a second link mode for updating the vehicle infotainment system through software stored in the mobile terminal of the at least one link mode, when a software update menu item is selected, transmitting a second control signal for controlling the mobile terminal to activate the second link mode to the mobile terminal through the wireless communication, and updating the vehicle infotainment system using the software stored in the mobile terminal through the communication method in the specific band, when the mobile terminal activates the second link mode.

10. The method according to claim 9, wherein the second link mode includes a serial AT attachment (SATA) mode.

11. A method of controlling a vehicle infotainment system, the method comprising:

establishing a wireless communication with a mobile terminal;

activating a first link mode of at least one link mode for transmitting data to and receiving data from the mobile terminal using a communication method in a specific band;

transmitting, to the mobile terminal, a first control signal for controlling the mobile terminal to activate the first link mode through the wireless communication;

activating a third link mode for mirroring of media output from the mobile terminal of the at least one link mode, when a mirroring menu item is selected, transmitting a third control signal for controlling the mobile terminal to activate the third link mode to the mobile terminal through the wireless communication, and mirroring the media output from the mobile terminal through the communication module and outputting the media through the output device, when the mobile terminal activates the third link mode.

12. The method according to claim 11, wherein the third link mode includes a mobile high-definition link (MHL) mode.

* * * * *